INVENTOR.
ROBERT P. GRAY
JOHN O. BEAL
BY
Jack M. Wiseman
ATTORNEY

Dec. 23, 1969    R. P. GRAY ET AL    3,485,083
OPPOSING FORCE SHOCK PROGRAMMER
Filed Aug. 14, 1967    5 Sheets-Sheet 4

INVENTOR.
ROBERT P. GRAY
JOHN O. BEAL
BY
ATTORNEY

INVENTOR.
ROBERT P. GRAY
JOHN O. BEAL
ATTORNEY

United States Patent Office 3,485,083
Patented Dec. 23, 1969

3,485,083
OPPOSING FORCE SHOCK PROGRAMMER
Robert P. Gray, Pacific Grove, and John O. Beal, Monterey, Calif., assignors to Monterey Research Laboratory, Inc., Monterey, Calif., a corporation of California
Filed Aug. 14, 1967, Ser. No. 660,417
Int. Cl. G01n *3/62*
U.S. Cl. 73—12                22 Claims

ABSTRACT OF THE DISCLOSURE

Shock testing apparatus employ programmers for controlling the impact of a moving body against a relatively stationary mass. It is the force versus deflection characteristics of the programmer that is adjusted to regulate the waveform of the shock pulse produced by the shock testing apparatus.

The programmer of the present invention comprises a pneumatic cylinder with a piston which produces through the piston rod an impact with an assembly of modular elastomer impact pads. The programmer cylinder includes a gas chamber on each side of the piston. Gas under an adjustable predetermined pressure is conducted to one chamber at one side of the piston and gas under another adjustable predetermined pressure is conducted to the other chamber at the other side of the piston. In this manner, opposing or bucking forces are applied to the piston. By adjusting the pressure under which the gases are respectively conducted to the programmer cylinder and the volumetric capacity of the respective chambers of the cylinder, the force versus deflection characteristics of the programmer can be adjusted. It is the adjustment of the force versus deflection characteristices of the programmer that controls the shape, peak acceleration and duration of the shock pulse.

---

The present invention relates in general to apparatus for controlling the impact of a moving body against a relatively stationary mass, and more particularly to an improved shock programmer for shock testing apparatus.

An object of the present invention is to provide a programmer for shock testing apparatus wherein the waveform, peak acceleration and duration of the shock pulse may change with facility without sacrificing accuracy.

Another object of the present invention is to provide a programmer for shock testing apparatus wherein adjustments to regulate the programmer parameters are made remotely by adjustable regulating devices.

Another object of the present invention is to provide a programmer for shock testing apparatus, which can be adjusted with facility for regulating programmer parameters to reduce initial set-up time for a test to reduce recycle time between tests.

Another object of the present invention is to provide a programmer for shock testing apparatus which can be changed for producing various desired pulse waveforms without disassembling the programmer and without replacing metering pins, sleeves or the like.

The programmer of the present invention for shock testing apparatus employs a cylinder with a gas chamber on each side of a piston wherein gas under an adjustable predetermined pressure is conducted to one of the chambers at one side of the piston and gas under another adjustable predetermined pressure is conducted to the other chamber at the other side of the piston for applying opposed forces to the piston, whereby the pressure under which the gases are conducted, respectively, are adjusted to regulate the waveform of the shock pulse produced by the shock testing apparatus employing the programmer.

Other and further objects and advantages of the present invention will be apparent to one skilled in the art from the following description taken in conjunction with the accompanying drawings, in which:

Briefly described, shock testing apparatus comprise a vertically movable drop table carrying a programmer to produce an impact in a series mode between the programmer and a reaction mass. The drop table can fall under the force of gravity or be driven downwardly by power means. The reaction mass supports an assembly of elastomer modular pads which, in the case of long duration shock pulses, control the shock pulse onset and, in the case of short duration pulses significantly affect the pulse rise time. The programmer, in turn, controls the shape, peak acceleration and duration of the shock pulse or stated otherwise controls the waveform of the shock pulse.

While the impact pads are normally spaced from the programmer and are in contact with the programmer during the impact time, yet from the point of view of operation and characteristics, the impact pads are considered a part of the programmer. A description of impact shock testing apparatus, in general, may be found in the U.S. patent application, Ser. No. 552,551, filed on May 24, 1966, for Apparatus and Method For Selectively Programming Different Types of Shock Tests by Frank C. Bresk, Robert P. Gray, and John O. Beal which has issued into Patent No. 3,402,593 on Sept. 24, 1969. The assignee of the present patent application is also the assignee of the aforementioned patent application.

The programmer of the present invention comprises a cylindrical body and a piston disposed within the cylindrical body to separate the cylindrical body into two chambers, one on each side of the piston. Each chamber has the volumetric capacity thereof individually preselected. A suitable gas, such as nitrogen, under an adjusted precharge or predetermined pressure is conducted to one of the chambers and a suitable gas, such as nitrogen, under another adjusted precharge or preselected pressure is conducted to the other chamber. While nitrogen gas is employed for conduction to each chamber, it is to be understood that other gases can be interchangeably used for one or more chambers. Thus, the programmer of the present invention contains a chamber containing gas under pressure on each side of the piston to produce opposing or bucking forces for application on the piston. Since the forces on the piston are from opposite directions, the pressure of the gas in the respective chambers can be adjusted to regulate effective yieldability or stiffening characteristics of the programmer and to tend to regulate linearity or non-linearity characteristics of the grammer. In this manner, the force versus deflection characteristics of the programmer can be adjusted to regulate the shape, peak acceleration and duration of the shock pulse or stated otherwise the waveform of the shock pulse.

Figure 1:
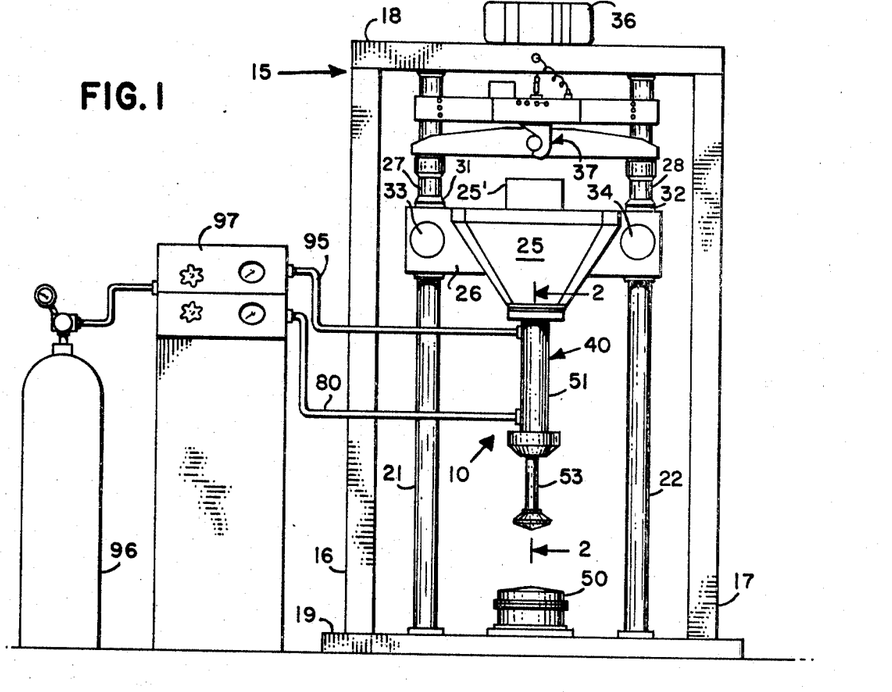
FIGURE 1 is a diagrammatic elevational view of an impact shock testing apparatus employing the programmer of the present invention.

Illustrated in FIGURE 1 is an impact shock testing apparatus 10, which, in the exemplary embodiment, is a high velocity, high acceleration shock test machine used to stock test specimens. The shock testing apparatus 10 includes a suitable frame 15 having a pair of upright posts 16 and 17. At the top of the upright posts 16 and 17, the frame 15 includes an interconnecting transverse member 18 that is secured to the posts 16 and 17. The feet of the upright posts 16 and 17 are mounted on a reaction mass 19.

Supported by the frame 15 are circular cross-sectional upright guide rails 21 and 22 along which run a metal drop or shock table 25. In the exemplary embodiment, the guide rails 21 and 22 are made of centerless ground, hard chrome plated material. Preferably, the shock table 25 is of one piece aluminum forging. A specimen 25' is secured to the drop table 25. The upper portions of the rails 21 and 22 are secured to the interconnecting transverse member 18 by suitable collars and the feet of the rails 21 and 22 are fixed to the base 19 by suitable collars.

In order for the drop table 25 to run along the posts 21 and 22, a vertically movable interconnecting transverse member 26 is arranged to raise and hold the drop table 25 along the rails 21 and 22. Toward this end, the interconnecting transverse member 26 is attached to suitable bearings 27 and 28, which embrace the rails 21 and 22, respectively. In the exemplary embodiment, the bearings are made of bronze. The bearings 27 and 28 carry metal guide journals 31 and 32, respectively, which are attached to lend support to the drop table 25.

Each of the guide journals includes a suitable friction brake. The guide journals 31 and 32 include friction brakes 33 and 34, respectively, which operate to force respective braking elements, not shown, against the guide rails 21 and 22, respectively, in a well-known manner. The braking elements, preferably, are treated bronze shoes that ride on the guide rails. Solenoid valve controlled air lines, not shown, serve to operate the brakes after the table 25 has rebounded upwardly following a completed shock pulse as is well-known in the art. During the pulse time, a switch, now shown, is triggered to activate the brake circuit and apply the brakes during rebound.

A built-in electric motor hoist 36 with cables in a well-known and conventional manner lifts the connecting member 26 along with the drop table 25. A conventional and well-known pneumatic release latch assembly 37 is employed to release the connecting member 26 when it is desired to have the drop table 25 fall for a test pulse. The falling package includes the drop table 25, the connecting member 26, specimen 25', part of the pneumatic release latch assembly 37 and a programmer 40 to be described in detail hereinafter.

Mounted on the base 19 in vertical alignment with the vertical axis of the programmer 40 is an assembly of elastomer modules or impact pads 50. The stiffening characteristics of the impact pads 50 are changed by altering the number and/or type of the elastomer modules. Therefore, the rise time of a test pulse is controlled by changing the number and/or types of elastomer modules in the bolted assembly. A set of elastomer modules which, in the case of long duration pulses control the pulse onset and in the case of short duration pulses affect the pulse rise time. While the impact pads 50 are normally spaced from the programmer 40 and are in contact with the programmer 40 during the impact time, yet from the point of view of operation and characteristics, the impact pads 50 are considered a part of the programmer.

In the operation of a typical cycle, an arming switch, not shown, is actuated to the safe position. A hoist switch, not shown, is pressed and held until the release latch assembly 37 re-engages the drop table 25. The hoist switch is then actuated and held in another position. Thereupon, the drop table brakes 33 and 34 release automatically and the drop table 25 is raised to the preselected drop height where the hoist 36 stops automatically. The arming switch is placed in the armed position to activate drop buttons, not shown. The drop buttons are then pressed to open the pneumatic release latch assembly 37 and the drop table 25 falls. The programmer 40 in a series mode hits the elastomer modules impact pads 50. The drop table 25 and the programmer 40 impact on the impact pads 50 and the reaction mass or base 19. This action causes a rebound of the drop table 25. During the pulse time, a switch, not shown, is triggered to activate the brake circuit and apply the brakes 33 and 34. The cycle may then be repeated.

Figures 2, 11:
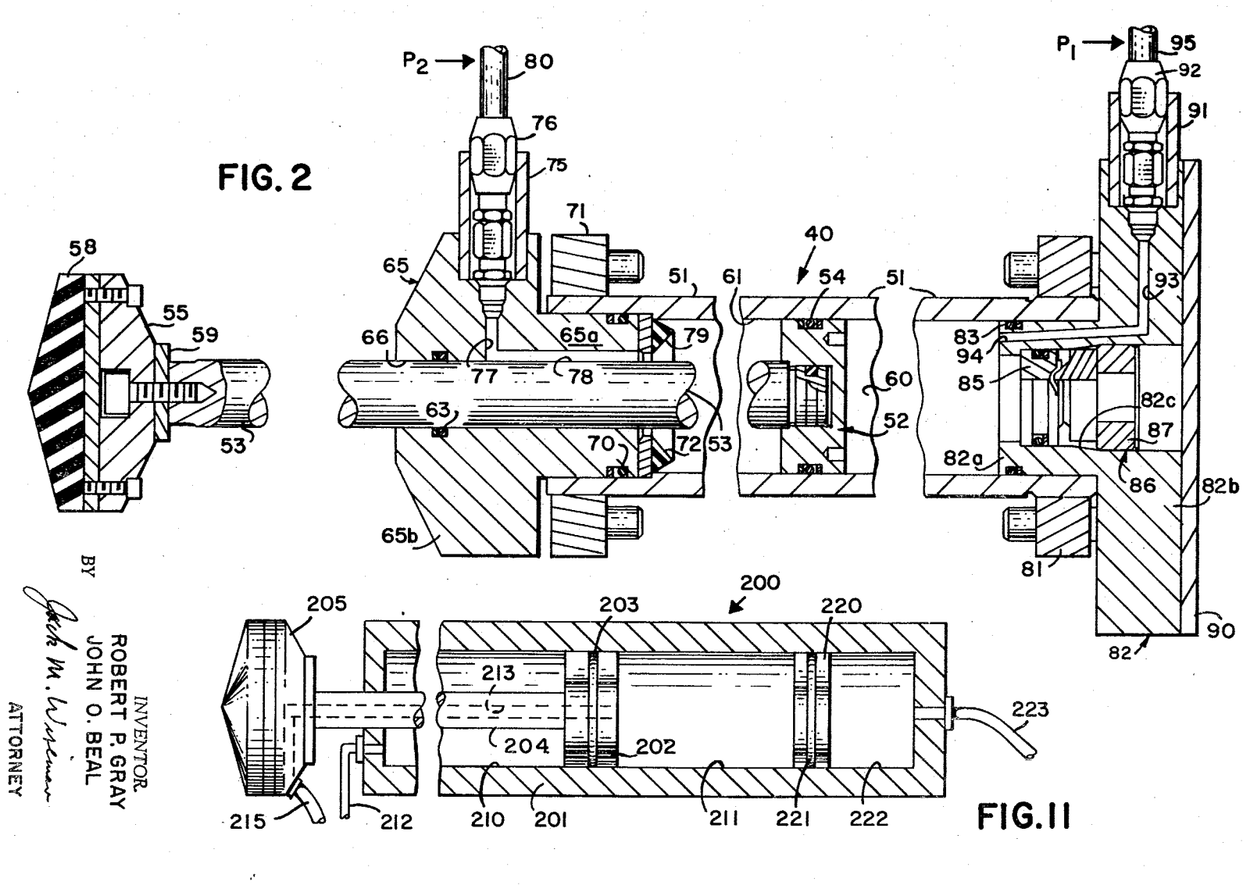
FIGURE 2 is a longitudinal cross sectional view of the programmer embodying the present invention taken along line 2—2 of FIGURE 1.
FIGURE 11 is a diagrammatic illustration of a modification of the programmer shown in FIG. 2.

Illustrated in FIGURE 2 is the programmer 40 of the present invention which comprises a gas cylinder 51 of suitable metal material, such as steel. Disposed within the cylinder 51 is a piston 52 with a piston rod 53. The free end of the piston rod 53 confronts the impact pads 50 and the axis of the piston rod 53 is vertically aligned with the longitudinal axis of the impact pads 50. A suitable O-ring 54 forms a seal between the inner wall of the cylinder 51 and the piston 52. At the lowermost end of the piston rod 53 is attached by suitable means, such as screws, a bumper support 55. Secured to the bumper support 55 by suitable screws is a bumper pad 58 of resilient material. A washer 59 is located between the end of the piston rod 53 and the bumper support 55.

The piston 52 divides the cylinder 51 into two chambers 60 and 61. A plug 65 is fitted to the lower end of the cylinder 51 below the piston 52. An O-ring 63 is located between the piston rod 53 and an inner wall of the plug 65 for forming a tight seal therebetween. The plug 65 is formed with a cylindrical bore 66 to receive the piston rod 53. The plug 65 has a reduced diameter portion 65a that is inserted into the lower end of the cylinder 51. An O-ring 70 forms a seal between the inner wall of the cylinder 51 and the outer wall of the reduced diameter section 65a. The increased diameter portion 65b of the plug 65 forms an abutment or shoulder engaging the lowermost end of the cylinder 51. A ring 71 with an internally threaded wall is disposed in threaded engagement with an externally threaded wall at the lowermost portion of the cylinder 51. Secured to the exposed wall of the plug 65, which is inserted in the cylinder 51, is a suitable bumper 72 of resilient material. The bumper 72 has a cylindrical base that receives the piston rod 53. The bumper 72 seats along the junction between the reduced diameter section 65a of the plug 65 and the inner wall of the cylinder 51.

Mounted on the plug 65 by suitable screws is a sleeve 75 that holds in fixed relation a connector 76. The connector 76 is in communication with the chamber 61 of the cylinder 51 through the following passageways: transverse channel 77 in the plug 65, axial channel 78 in the plug 65, and opening 79 in the bumper 72. Attached to the connector 76 is a suitable hose assembly 80.

At the upper end of the cylinder 51 and above the piston 52 is a ring 81 with an internally threaded wall that is disposed in threaded engagement with the threaded upper outer wall of the cylinder 51. Fitted in the upper end of the cylinder 51 is a base 82, which has a reduced diameter portion 82a that is inserted into the upper end of the cylinder 51. An increased diameter portion 82b of the base 82 engages the upper end of the cylinder 51 and forms therealong a shoulder or an abutment. An O-ring 83 forms a seal between the inner wall of the cylinder 51 and the outer wall of the reduced diameter portion 82a of the base 82. Seated within a cylindrical bore 82c of the base 82 is a burst diaphragm 85 which is a safety device against over pressure. Also seated in the cylindrical bore 82c above the burst diaphragm 85 is a sleeve 86 that contains a plug 87. An O-ring seals the outer wall of the diaphragm 85 with the inner wall of the reduced diameter portion 82a of the base 82. Attached to the base 82 by suitable means, such as screws, is a mounting plate 90 that is also fixed to the lower wall of the drop table 25.

Mounted on the base 82 by suitable screws is a sleeve 91 that holds in fixed relation a connector 92. The connector 92 is in communication with the chamber 60 of the cylinder 51 through the following passageways: transverse channel 93 in the base 82 and channel 94 in the base 82. Attached to the connector 92 is a suitable hose assembly 95.

The hose assemblies 80 and 95 communicate with a supply of gas under pressure, such as nitrogen gas, contained within a cylinder or bottle 96 through a pressure control panel 97. It is the remotely located pressure control panel 97 that controls and regulates individually the pressure under which gas flows through the hose assemblies 80 and 95, respectively. Thus, the flow of nitrogen gas through the hose assembly 95 may be under pressure $P_1$ and the flow of nitrogen gas through the hose assembly 80 may be under pressure $P_2$. Other gases under pressure may be employed in one or more of the chambers.

In order to adjust the pressure $P_1$ and $P_2$ of the nitrogen gas flowing into the chambers 61 and 60, respectively, through the hose assemblies 80 and 95, respectively, the control panel 97 includes pressure regulators or valves with control knobs. Conventional pressure gauges are connected to the hose assemblies to register the pressure for the respective chambers. The pressure in the bottle 96 must be sufficiently high to pressurize each chamber of the programmer 40 with the highest pressure which will be required for testing. In the typical embodiment, the bottle contains nitrogen gas under maximum pressure of 2200 p.s.i.

According to the present invention, the programmer 40 includes two chambers 60 and 61 of gas under pressure with the chambers separated by the piston 52. Through this arrangement, opposing forces are applied to the piston 52. The force-deflection characteristic of each applied force could be characterized as non-linear stiffening or non-linear softening. Since the forces applied to the piston 52 are bucking or applied from opposite directions, the pressure of the gas in the chambers 60 and 61 can be adjusted respectively to cancel out or reduce the non-linearity of the net applied force. Preselecting the volumetric capacity of the respective chambers would have a similar effect.

Figure 3:
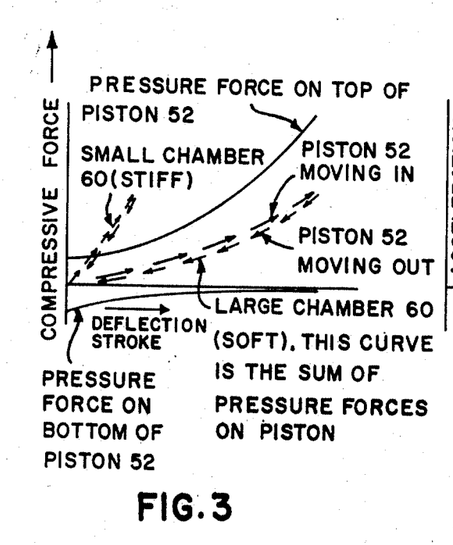
FIGURE 3 is a graphic illustration of force versus deflection for the programmer illustrated in FIGURES 1 and 2.

The force-deflection characteristics of the programmer 40 (FIG. 3) controls the waveform of the impact pulse. By regulating the pressure of the gas in the chambers 60 and 61 so that the programmer 40 has a linear force-deflection characteristic, a half sine pulse is generated. On the other hand, by regulating the pressure of the gas in the chambers 60 and 61 so that the programmer 40 has a non-linear stiffening characteristic, a haversine pulse is produced. By adjusting the pressure of the gas entering the chambers 60 and 61, respectively, for applying bucking forces to the piston 52, the programmer 40 can be regulated to be approximately linear or to have varying degrees of non-linearity. Further, the resultant force deflection characteristics start at zero to produce a smooth onset in the shock pulse (FIG. 3).

Figure 4:
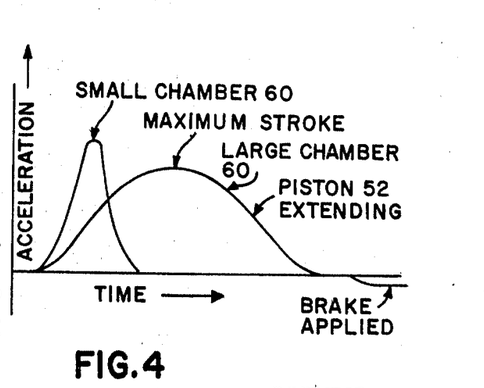
FIGURE 4 is a graphic illustration of acceleration versus time for the programmer illustrated in FIGURES 1 and 2.

Generally, the greater the stiffness characteristic of the programmer, the shorter the duration of the impact pulse. A stiff programmer generates a high frequency oscillation and a soft programmer generates a low frequency oscillation. The shock pulse produced by the programmer is ½ cycle of such oscillation. An acceleration versus time or pulse diagram showing the half sine pulses resulting from the programmer 40 is shown in FIG. 4. The shock pulse may be defined as the plot of acceleration of the drop table against time that the programmer is compressed between the table and the reaction mass. During the impact acceleration and rebound, the piston strokes into the programmer compressing the volume of gas contained in the chamber 60 and expanding the gas contained in the chamber 61. Subsequently, the piston extends as the table rebounds, expanding the gas contained in the chamber 60 and recompressing the gas contained in the chamber 61. At the conclusion of the pulse, the pressures return to the original charge pressures.

In the operation of the impact testing apparatus 10, an arming switch, not shown, is actuated to the safe position. A hoist switch, not shown, is pressed and held until the release latch assembly 37 re-engages the drop table 25. The hoist switch is then actuated and held in another position. Thereupon, the drop table brakes 33 and 34 release automatically and the drop table 25 is raised to the preselected drop height where the hoist 36 stops automatically. The arming switch is placed in the armed position to activate drop buttons, not shown. The drop buttons are then pressed to open the pneumatic release latch assembly 37 and the drop table 25 falls. The programmer 40 in a series mode hits the elastomer modules impact pads 50. The drop table 25 and the programmer 40 cause an impact with the impact pads 50 and the base or reaction mass 19. This action causes a rebound of the drop table 25. During the pulse time, a switch, not shown, is triggered to activate the brake circuit and apply the brakes 33 and 34. The cycle may then be repeated.

Figures 5, 5A:
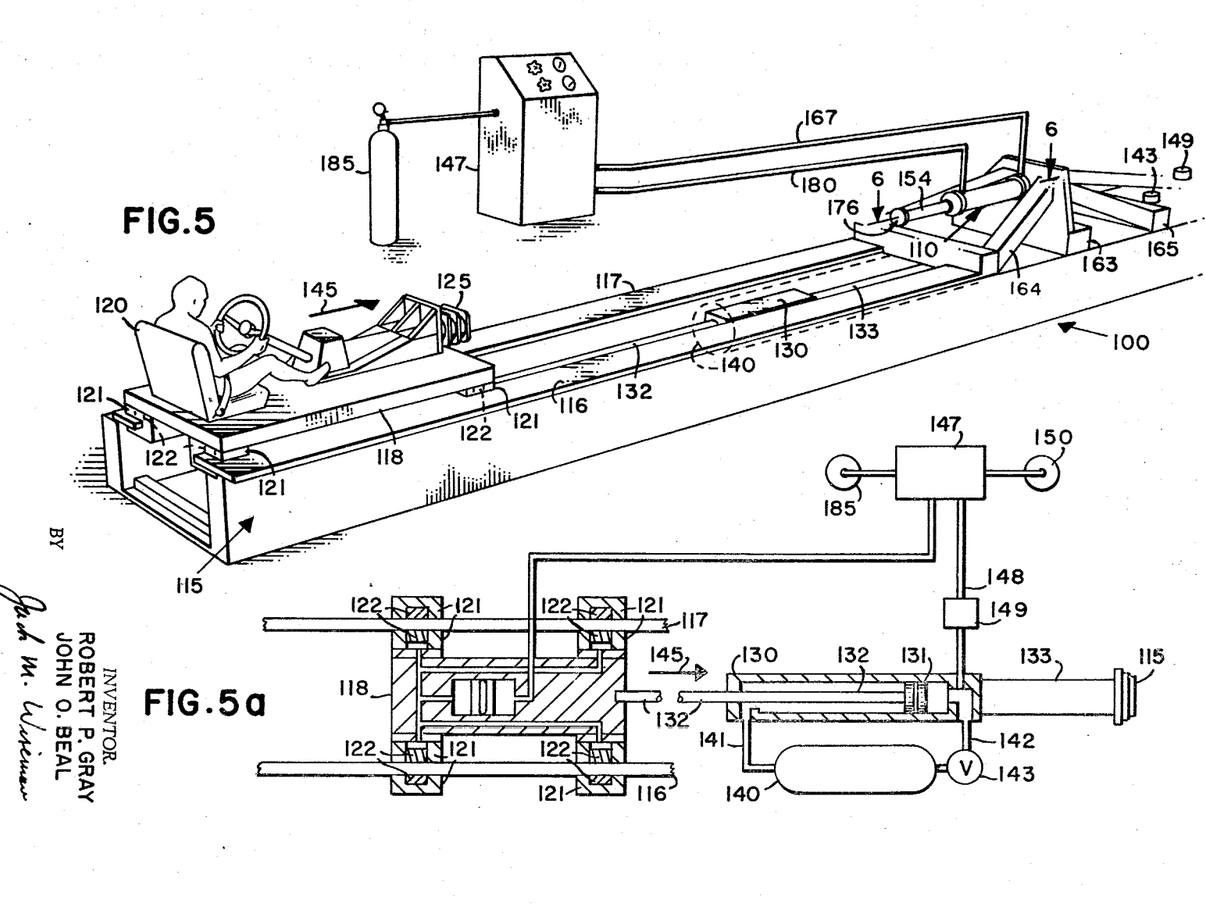
FIGURE 5 is a digrammatic illustration of an automotive crash simulator employing the programmer of the present invention.
FIGURE 5A is a fragmentary schematic diagram of the automotive crash simulator shown in FIGURE 5.

Illustrated in FIG. 5 is an impact shock testing apparatus in the form of an automotive crash simulator 100, which embodies a programmer 110 (FIG. 6) of the present invention. The simulator is employed for testing of all items related to protecting automobile passengers during crash conditions. It uses the principle of impact-with-rebound to simulate crashes.

Figure 6:
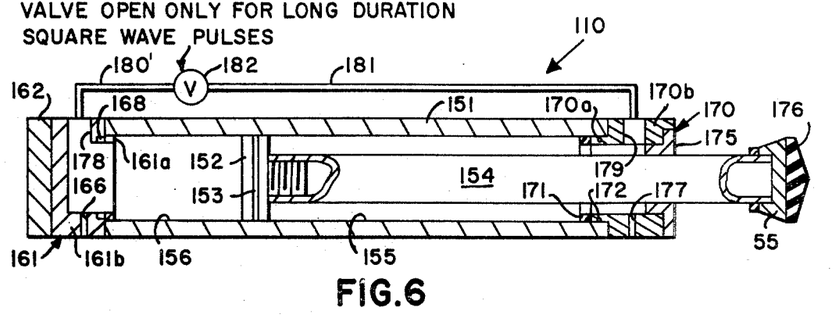
FIGURE 6 is a longitudinal diagrammatic cross-sectional view of the programmer shown in FIGURE 5 taken along line 6—6 of FIGURE 5.

The crash programmer 110 of the present invention serves to control the crash acceleration pulse to provide various pulse waveforms, peak accelerations and durations. In addition, the programmer 110 can be employed to simulate pulses produced by both barrier crashes and car-to-car crashes.

The automotive crash simulator 100 comprises a horizontally disposed main frame 115, which is a channel-shaped structure comprising a weldment of rectangular steel members that are bolted as an assembly to a concrete foundation. Guide rails, such as chrome plated steel bar guide rails 116 and 117, are secured by bolts to the top of the frame 115.

A carriage 118 is supported by the guide rails 116 and 117 for movement along a horizontal rectilinear path. Mounted on the carriage 118 for movement therewith is a test specimen 120, which includes a dummy placed on a seat facing a steering column and wheel. The carriage 118 is a weldment of steel plate and rectangular steel members.

Bearings, such as four bronze guide bearings 121, are included in the carriage 118 for supporting the carriage 118 for movement on the guide rails 116 and 117. The bearings 121 restrict the motion of the carriage 118 to substantially horizontal rectilinear movement and restrict cross coupling forces caused by center of gravity offset, eccentric specimen response and other elements which would tend to move the carriage vertically, laterally, in pitch or yaw.

Carriage brakes 122 are used as the release mechanism and as the means for stopping the carriage 118 after rebound to prevent secondary impacts. In the typical embodiment, there are four carriage brakes. Each carriage brake 122 includes a housing within which is contained a brass brake shoe or piston, not shown. In a well-known manner, when the brake pistons or shoes are actuated, they are forced against the associated guide rail, which provides a friction force to resist the motion of the carriage 118. The brakes 122 are actuated by a high pressure system. In the exemplary embodiment, bottled nitrogen gas serves as the pressure source for the brakes 122. This applied pressure for actuating the brakes 122 are actuated by a high pressure system. In the exemplary embodiment, bottled nitrogen gas serves as the pressure source for the brakes 122. This applied pressure for actuating the brakes 122 is 2200 p.s.i. maximum. The brakes 122 provide a fast response, which is required to prevent drag during release and permit catching during the rebound portion of the shock pulse.

Mounted on the forward end of the carriage 118 for movement therewith are suitable impact pads 125 (FIG. 5). In the preferred embodiment, the impact pads 125 are in the form of a modular elastomer assembly. Horizontally aligned with the impact pads 125 for impact therewith in a series mode is the crash programmer 110 of the present invention. While the impact pads 125 are normally spaced from the programmer 110 and are in contact with the programmer 110 during the impact time, yet from the point of view of operation and characteristics, the impact pads 125 are considered a part of the programmer 110.

For accelerating the carriage 118 during test, a long stroke pneumatic cylinder 130 (FIGS. 5 and 5A) includes a piston 131 with a piston rod 132 that is connected to the carriage 118 by suitable means, such as bolts. The cylinder 130 is anchored to the frame 115 by suitable means 133, such as rectangular steel members and steel rods. The cylinder 130 through the piston rod 132 pulls the carriage toward the programmer 110 with a relatively constant accelerating force to establish an impact between the programmer 110 and the impact pads 125.

To actuate the piston 131 with the piston rod 132, a relatively large air accumulator or compressed air receiver 140 is connected to the cylinder 130 for communication with ports thereof located at each side of the piston 131 through conduits 141 and 142 and a fast acting solenoid valve 143. For accelerating the carriage in the direction of an arrow 145, air under pressure stored in the accumulator 140 is communicated to the cylinder 130 through the conduit 141. Prior to impact between the impact pads 125 and the programmer 110, a switch, not shown, is activated to operate the fast acting solenoid valve 143 to vent the ports on both sides of the piston 131 for equalizing pressure on both sides of the piston 131. Through this action, the cylinder 130 through the piston rod 132 exerts a relatively low push force on the carriage 118 during impact and rebound. After the carriage 118 is stopped by the rebound brakes 122, it is then pushed back to the start position by the relatively low push force.

Also connected to the cylinder 130 through a pressure regulating console 147, conduit 148 and a valve 149 is an air compressor 150. Air under pressure, in the exemplary embodiment, in the vicinity of 400 p.s.i., is supplied from the air compressor 150. Since a small volume of air is vented in the accumulator 140 between tests, the air compressor 150 serves to restore the accumulator 140 to its operating condition.

In FIG. 6 is illustrated the programmer 110 which embodies the present invention. The programmer 110 controls the shape, peak acceleration and duration of the acceleration pulse to which the carriage 118 is subjected at impact. Stated otherwise, the waveform of the shock pulse or the shape peak acceleration and duration of the shock is controlled by adjusting the force versus deflection characteristics of the programmer 110.

The programmer 110 comprises a metal cylinder 151 of suitable material, such as steel. Positioned in the cylinder 151 is a piston 152. An O-ring 153 forms a seal between the inner wall of the cylinder 151 and the outer wall of the piston 152. A piston rod 154 of suitable material, such as a tubular steel member, is secured to the piston 152 by suitable means, such as screws. Through this arrangement, the piston 152 divides the cylinder 151 into chambers 155 and 156. The chambers 155 and 156 have the piston 152 disposed therebetween.

At the rearward end of the cylinder 151 is located a cylindrical base 161, which has a reduced diameter portion 161a that is inserted into the rearward end of the cylinder 151 to close off the same. The increased diameter section 161b provides an abutment or forms a shoulder for the rearward end of the cylinder 151. The base 161 is secured by suitable means, such as bolts, to a mounting plate 162, which in turn, is fixedly attached to an upright metal stand 163, such as a steel plate with a flanged bottom that is mounted on the main frame 115 by bolts or the like. The upright plate 163 is held securely to the main frame 115 by angularly disposed metal frames 164 and 165, which are also mounted on the main frame 115.

Formed in the base 161 is an inlet port 166 (FIG. 6) in which fits a sleeve, not shown, that holds a connector, not shown. Attached to the connector is a suitable hose assembly 167 (FIG. 5). This arrangement has been described in detail in connection with the impact shock testing apparatus 10. An O-ring 168 forms a seal between the inner wall of the cylindrical body 151 and the outer wall of the base 161.

A plug 170 is fitted in the forward end of the cylindrical body 151 through a reduced diameter portion 170a that is inserted into the forward end of the cylindrical body 151. Fixed to the exposed wall of the reduced diameter portion 170a is a resilient bumper 171. An O-ring 172 forms a seal between the inner wall of the cylinder 151 and the outer wall of the reduced diameter portion 170a. An increased diameter portion 170b of the plug 170 provides a shoulder or an abutment for the forward end of the cylinder 151. The plug 170 and the bumper 171 have a cylindrical bore therein to receive the end of the piston rod 154 that extends out of the cylinder 151 toward the impact pads 125.

Seated in the cylindrical bore is a cylindrical cap 175 that is secured to the plug 170 by screws and has a cylindrical bore to receive the piston rod 154 therethrough. The cap 175 retains the piston rod 154 in position. At the face of the piston rod 154 is a resilient bumper 176 that is fixedly mounted thereon. The face end of the piston rod 154 confronts the impact pads 125 and the axis of the piston rod 154 is in horizontal alignment with the longitudinal axis of the impact pads 125.

Formed in the plug 170 is an inlet port 177 in which fits a sleeve, not shown. The sleeve holds in fixed relation a connector, not shown, attached to the connector is a suitable hose assembly 180 (FIG. 5). This arrangement has been described in detail in connection with the impact shock testing apparatus 10. Also formed in the base 161 and the plug 170 are ports 178 and 179, respectively. The ports 178 and 179 are interconnected through conduits 180' and 181 and a valve 182. The valve 182 is open only for long duration square wave impact pulses.

The hose assemblies 167 and 180 communicate with a supply of gas under pressure, such as nitrogen gas, contained within a cylinder or bottle 185 (FIG. 5A) through the control panel 147 (FIGS. 5 and 5A). It is the pressure control panel 147 that controls and regulates individually the pressure under which gas flows through the hose assemblies 167 and 180, respectively. Thus, the flow of nitrogen gas through the hose assembly 167 may be under pressure $P_1$ and the flow of nitrogen gas through the hose assembly 180 may be under pressure $P_2$.

In order to adjust the pressure $P_2$ and $P_1$ of the nitrogen gas flowing into the chambers 156 and 155, respectively, through the hose assemblies 167 and 180, respectively, the control panel 147 includes pressure regulators or valves with control knobs. Conventional pressure gauges are connected to the hose assemblies to register the pressure for the respective chambers. The pressure in the bottle 185 must be sufficiently high to pressurize each chamber of the programmer 110 with the highest pressure which will be required for testing. In the typical embodiment, the bottle 185 contains nitrogen gas under a maximum pressure of 2200 p.s.i. Gas other than nitrogen gas may be supplied under pressure to one or more of the chambers of the programmer.

According to the present invention, the stiffness characteristics of the programmer 110 are controlled by preselecting the volumetric capacity of the chambers 156 and 155 and by regulating individually the precharge or predetermined pressure of the nitrogen gas entering the chambers 155 and 156, respectively. The regulation of the precharge or predetermined pressure is accomplished by devices within the control panel 147.

Through this arrangement, opposing forces are applied to the piston 152. Since the forces applied to the piston 152 are bucking or applied from opposite directions, the pressure of the gas in the chambers 156 and 155 is adjusted to regulate the linearity or non-linearity characteristics of the net applied force.

By regulating the pressures $P_1$ and $P_2$ to increase the linearity characteristics of the programmer 110, half sine pulses are produced. Likewise, the programmer 110 can be adjusted to change the pulse duration of the shock pulse. This is accomplished by changing the relative stiffness characteristics of the applied opposing forces on the piston 152 by regulating the precharge pressures $P_1$ and $P_2$, respectively, through making the valve adjustments at the control panel 147. In adjusting to very short durations, the stiffness of the modular elastomer impact pads 125 is charged in a well-known manner.

The programmer 110 can be regulated to generate square wave or trapezoidal pulses. The precharge pressures $P_1$ and $P_2$ under which gas is conducted to the chambers 156 and 155, respectively, control the acceleration level of the dwell portion of the impact pulse and the impact velocity determines the duration of the shock pulse. The rise time of the shock pulse is controlled by the stiffness of the assembly of modular impact pads 125.

The larger chamber 156 is used for programming the higher acceleration and shorter duration square wave pulses; and the chambers 155 and 156 are used to program the lower acceleration and long duration pulses. By opening the valve 182 (FIG. 6), it is possible to increase the chamber volume to produce long duration square wave shock pulses.

For producing haversine, triangular and rounded cusp pulses, the programmer 110 is adjusted to produce a non-linear, stiffening characteristic. The pressures $P_1$ and $P_2$ under which gas is conducted, through the console 147 are adjusted to increase the non-linear characteristic of the programmer 110. By adjusting the pressure of the gas entering the chambers 155 and 156, respectively, for applying a bucking or opposing forces to the piston 152, the gragrammer 110 can be regulated to be approximately linear for half sine shock pulses or to have varying degrees of non-linearity for haversine, triangular and rounded cusp pulses.

Figure 7:
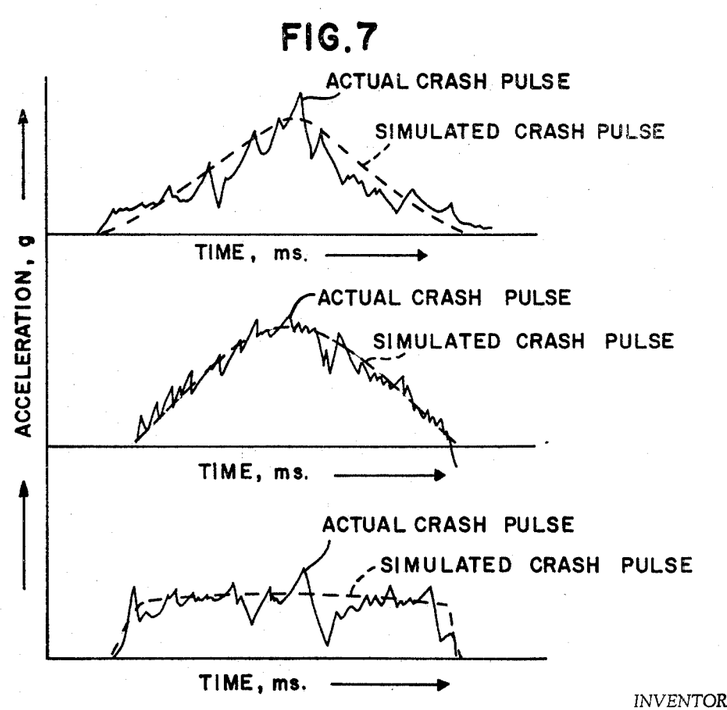
FIGURE 7 is a graphic illustration of acceleration versus time for the programmer illustrated in FIGURES 5 and 6.
Figure 8:
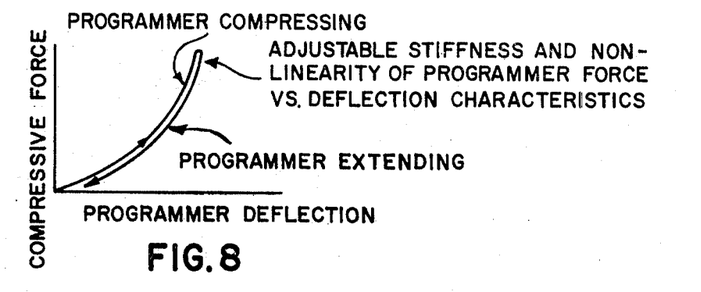
FIGURE 8 is a graphic representation of compressive force versus programmer deflection during a simulated crash pulse employing the programmer of FIG. 6 with rebound.

In FIG. 7, the graphs thereof illustrate typical examples of crash pulses simulated by the programmer 110. In the operation of the programmer 110, the carriage 118 is accelerated to cause the impact pads 125 to produce an impact with the bumper pad 176 of the programmer 110. When the impacts pads 125 collides with the bumper pad 176, the programmer 110 is compressed until it has absorbed all the kinetic energy of the carriage 118 and has decelerated the carriage 118 to zero velocity. The programmer 110 then expands and returns the stored energy to the carriage 118 to return it back toward the initial starting position (FIG. 8).

Figure 9:
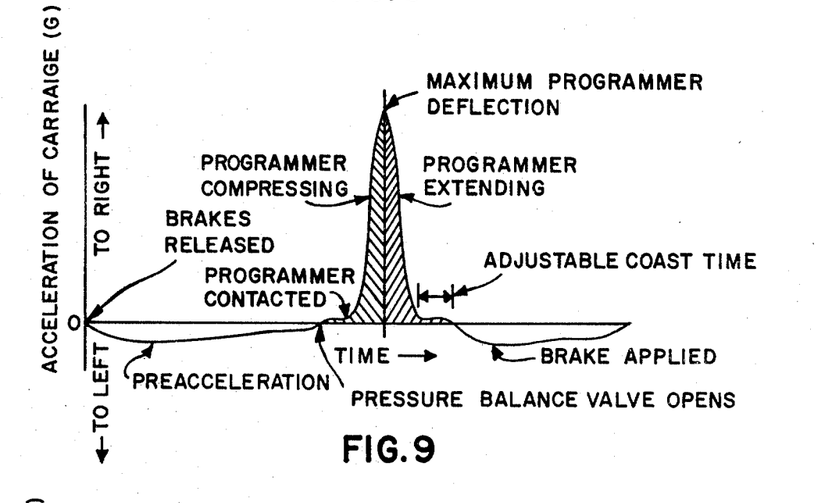
FIGURE 9 is a graphic representation of acceleration of the carriage of the automotive crash simulator shown in FIG. 5 versus time.
Figure 10:
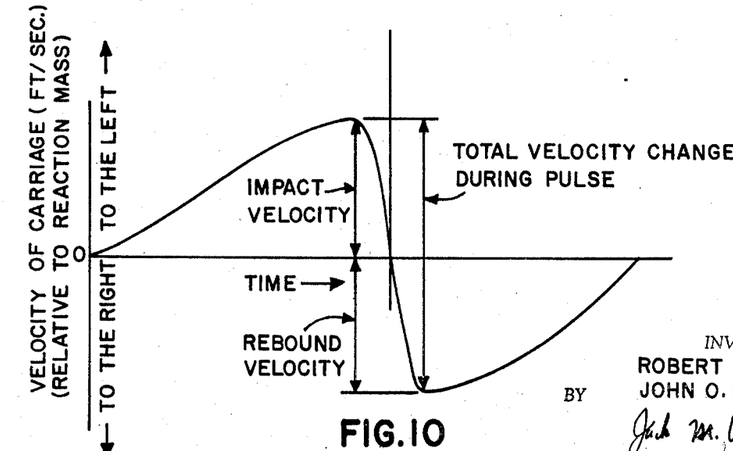
FIGURE 10 is a graphic representation of the velocity of the automotive crash simulator shown in FIG. 5 versus time.

The first half of the crash pulse (FIG. 8) is applied during the time the carriage is being stopped and the second half of the crash pulse is applied during rebound. Acceleration of the carriage 118 is in the same direction during both the deceleration and rebound portions of the pulse (FIG. 9). The velocity of the carriage at the end of the rebound portion of the pulse is approximately equal to the velocity before impact but in the opposite direction (FIG. 10). The total velocity change of the carriage 118 during the shock pulse time is, therefore, approximately equal to twice the initial impact velocity.

It is to be observed from the foregoing that the stiffness characteristics of the programmer 110 are adjusted with facility over a wide range so that the pulse shape, peak acceleration and duration can be independently controlled. Once the programmer 110 is adjusted to produce a given shock pulse, it requires no recharging or resetting to run repeat tests.

In the operation of the automotive crash simulator 110, the carriage 118 is held by the brakes 122 between the desired starting station and the collision station. The brakes 122 are released and air under pressure in the cylinder 130 actuates the piston 131 to push the carriage through the piston rod 132 back to the starting station. The brakes 122 are automatically turned on when a limit switch, not shown, at the starting station is actuated.

Now, the fast acting solenoid valve 143 is energized and the push end of the cylinder 130 is closed and vented to atmosphere. Generally, the pressure of the accumulator 140 is reduced during a test, because of the venting of air therein and is restored to the operating pressure by means of the compressor 150.

The simulator is then armed and the brakes 122 are released by pressing buttons, not shown, on the console 147. The cylinder 130 through the piston rod 132 pulls the carriage 118 toward the programmer 110 accelerating the carriage 118 at a relatively constant rate. At this time, the carriage 118 trips a limit switch, not shown, which opens the fast acting, solenoid valve 143. The pressure on both sides of the piston 131 rapidly equalizes and the force exerted by the piston rod 132 reduces to a very low value before the impact pads 125 collides with the bumper 176. The carriage 118 through the impact pads 125 hits the programmer 110 through the bumper 176 on the piston rod 154 and rebounds. The carriage 118 now coasts away from the programmer 110 and the brakes 122 are activated by a time delay circuit, not shown, which is activated by an inertia switch, not shown, at impact. The brakes 122 decelerate the carriage 118 to zero velocity before the starting station is reached. The cycle may then be repeated to start the succeeding test.

Illustrated in FIG. 11 is a modification of the programmer 40 shown in FIG. 2. The programmer 200 (FIG. 11) includes a cylinder 201 of suitable metal such as steel. Mounted in the cylinder 201 is a piston 202. An O-ring 203 carried by the wall of the piston 202 is in sealing engagement with the inner wall of the cylinder 201. Thus, the piston 202 is in sealing engagement with the cylinder 201.

One end of a piston rod 204 is fixed to the piston 202 for movement therewith. The other end of the piston rod 204 projects out of the cylinder 201. A bumper 205 of preferably resilient material is attached to the free end of the piston rod 204.

The piston 202 separates the cylinder 201 by forming a wall between a chamber 210 and 211, there being a chamber on each side of the piston 202. A suitable gas under a precharged or preselected pressure, such as nitrogen gas, is conducted to the chamber 210 through a suitable connector and hose assembly 212. Likewise, a suitable gas, under another precharged or preselected pressure, such as nitrogen gas, is conducted to the chamber 211 through a passageway 213 in the piston rod 204 and a suitable connector and hose assembly 215. The pressure under which gas is conducted to the chambers 210 and 211 are individually adjusted from a remote location, such as a console panel, in a manner previously described in connection with the programmer 40. As a consequence thereof, bucking or opposing forces are applied to the piston 202 in a manner previously described in connection with the programmer 40 for achieving similar or like results.

In addition to the foregoing, a second piston 220 is disposed in the cylinder 201. An O-ring 221 mounted in the wall of the piston 220 is in sealing engagement with the inner wall of the cylinder 201. Thus, the piston 220 is in sealing engagement with the cylinder 201. The piston 220 forms the upper wall for the chamber 211 and the piston 202 forms the lower wall for the chamber 211. The cylinder 201 also includes a third chamber 222. It is the piston 220 that provides a wall to separate the chambers 211 and 222. A suitable fluid under a precharged or preselected pressure, such as oil, is conducted to the chamber 222 through a suitable connector and hose assembly 223. The oil or fluid pressure can be independently adjusted at a remote location.

Through this arrangement, the adjustment of the fluid pressure of the fluid of the chamber 222 serves to control the effective volume or length of the cylinder 201 or the chambers therein. As a consequence thereof, a wider range of adjustment is achieved in the waveform of the shock pulse or the stiffness characteristics of the programmer of the shock testing apparatus employing the programmer 200.

While the impact shock testing apparatus 10 shows the programmer 40 attached to the drop table 25 and the impact pads 50 attached to the reaction mass 19, it is apparent that the impact pads 50 could be attached to the drop table 25 and the programmer 40 attached to the reaction mass 19. Likewise, while the automotive crash simulator 100 shows the programmer 110 attached to the stationary plate 163 and the impact pads 125 attached to the carriage 118, it is apparent that the programmer 110 could be attached to the carriage 118 and the impact pads 125 could be attached to the upright plate 163. Also the programmers 40 and 110 could be disposed either in a vertical or horizontal position.

Having thus described our invention, what we claim as new and desire to protect by Letters Patent is:

1. In shock testing apparatus a cylinder, a piston disposed in said cylinder in sealing engagement therewith and separating said cylinder into a first chamber on one side of said piston and a second chamber on the other side of said piston, a piston rod secured at one end thereof to said piston and the other end thereof projecting out of said cylinder, an impact pad assembly aligned with the free end of said piston rod for establishing an impact therewith, said piston rod in response to impact with said impact pad assembly receives and transmits impact force to said piston, and means communicating with said first and second chambers for supplying gas under a predetermined pressure to said first chamber and supplying gas under another predetermined pressure to said second chamber for applying opposing forces on said piston to control the acceleration versus time characteristics of said shock testing apparatus.

2. In a shock testing apparatus as claimed in claim 1 wherein said means communicating with said first and second chambers simultaneously supplies gas under a predetermined pressure to said first chamber and gas under another predetermined pressure to said second chamber.

3. In a shock testing apparatus as claimed in claim 1 wherein said means adjusts respectively the pressure under which said gas is supplied to said first and second chambers for regulating the acceleration versus time characteristics of said shock testing apparatus.

4. In a shock testing apparatus as claimed in claim 3 wherein said means includes remotely located devices for adjusting respectively the pressure under which said gas is supplied to said first and second chambers.

5. In a shock testing apparatus as claimed in claim 3 wherein the respective adjustments of the pressure under which gas is supplied to said first and second chambers control the waveform of a shock pulse produced by said shock testing apparatus.

6. In a shock testing apparatus as claimed in claim 3 wherein the respective adjustments of the pressure under which gas is supplied to said first and second chambers control the shape, peak acceleration and duration of the shock pulse produced by said shock testing apparatus.

7. In a shock testing apparatus as claimed in claim 3 wherein the respective adjustments of the pressure under which gas is supplied to said first and second chambers vary the magnitude of non-linearity of the resulting force versus deflection characteristics to control the resulting acceleration versus time characteristics of the shock testing apparatus.

8. In a shock testing apparatus as claimed in claim 3 wherein the opposing forces on said piston resulting from the respective adjustments of the pressure under which gas is supplied to said first and second chambers results in a shock testing apparatus with reduced non-linearity characteristics.

9. In a shock testing apparatus as claimed in claim 8 wherein the net applied forces on said piston results in said shock testing apparatus achieving a linear force-deflection characteristic to generate a half sine wave shock pulse.

10. In a shock testing apparatus as claimed in claim 8 wherein the net applied forces on said piston results in said shock testing apparatus having a non-linear force-deflection characteristic to generate a haversine shock pulse.

11. In a shock testing apparatus as claimed in claim 3 wherein the opposing forces on said piston resulting from the respective adjustments of the pressure under which gas is supplied to said first and second chambers controls the relative stiffness characteristic of said shock testing apparatus.

12. In a shock testing apparatus as claimed in claim 3 wherein the opposing forces on said piston resulting from the respective adjustments of the pressure under which gas is supplied to said first and second chambers controls the relative softness characteristic of said shock testing apparatus.

13. In a shock testing apparatus as claimed in claim 1 wherein said impact pad assembly comprises a plurality of elastomer modular impact pads.

14. In a shock testing apparatus as claimed in claim 13 wherein said piston rod is formed with a resilient bumper at the free end thereof for engaging said impact pad assembly.

15. In a shock testing apparatus as claimed in claim 1, a drop table having said cylinder attached thereto for movement therewith, means connected to said drop table for guiding said drop table for movement in a vertical direction, and means for securing said impact pad assembly at a fixed location, said piston rod being disposed in vertical alignment with said impact pad assembly for establishing an impact therewith in a series mode.

16. In a shock testing apparatus a claimed in claim 1, a carriage, means for moving said carriage along a horizontal path, said impact pad assembly being mounted on the forward end of said carriage for movement therewith, means for securing said cylinder at a fixed location, said piston rod being disposed in horizontal alignment with said impact pad assembly for establishing an impact therewith in a series mode.

17. In a shock testing apparatus as claimed in claim 1 wherein said gas supplied to said first and second chambers is nitrogen.

18. In a shock testing apparatus as claimed in claim 1 wherein the respective adjustments of the pressure under which gas is supplied to said first and second chambers control the shape, peak acceleration and duration of the shock pulse produced by said shock testing apparatus and the stiffness of said impact pad assembly controls the pulse rise of said shock pulse.

19. In a shock testing apparatus as claimed in claim 1 wherein the respective adjustments of the pressure under which gas is supplied to said first and second chambers controls the shape, peak acceleration and duration of the shock pulse produced by said shock testing apparatus and the stiffness of said impact pad assembly controls the pulse onset of said shock pulse.

20. In a shock testing apparatus as claimed in claim 1 wherein the opposing forces on said piston produce a force deflection characteristic for said shock testing apparatus in which the start of the force deflection characteristic is substantially at a zero magnitude.

21. In a shock testing apparatus as claimed in claim 1, a second piston disposed in said cylindrical body in sealing engagement therewith and spaced from said first mentioned piston, said second piston being arranged for separating said cylindrical body into said second chamber and a third chamber with said second chamber on one side of said second piston and said third chamber on the other side of said second piston, and means communicating with said third chamber for supplying fluid under pressure to said third chamber.

22. In a shock testing apparatus as claimed in claim 21 wherein said means communicating with said first and second chambers adjusts respectively the pressure under which said gas is supplied to said first and second chambers for regulating the acceleration versus time characteristics of said shock testing apparatus and said means communicating with said third chamber adjusts independently the pressure under which said fluid is supplied to said third chamber.

References Cited

UNITED STATES PATENTS

| | | | |
|---|---|---|---|
| 1,289,728 | 12/1918 | Giles | 267—65 |
| 2,601,551 | 6/1952 | Navarro et al. | 267—65 |
| 2,937,865 | 5/1960 | Patterson | 267—1 |
| 3,226,974 | 1/1966 | Bresk et al. | 73—12 |
| 3,402,593 | 9/1968 | Bresk et al. | 73—12 |

CHARLES A. RUEHL, Primary Examiner

U.S. Cl. X.R.

267—1